US011904699B2

(12) United States Patent
Chen et al.

(10) Patent No.: US 11,904,699 B2
(45) Date of Patent: Feb. 20, 2024

(54) VEHICLE-MOUNTED CHARGING DEVICE

(71) Applicant: Delta Electronics (Shanghai) Co., Ltd., Shanghai (CN)

(72) Inventors: May-Ling Chen, Shanghai (CN); Benze Zou, Shanghai (CN); Jianhong Zeng, Shanghai (CN); Chao Li, Shanghai (CN); Nan Ye, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 305 days.

(21) Appl. No.: 17/377,049

(22) Filed: Jul. 15, 2021

(65) Prior Publication Data
US 2022/0063412 A1 Mar. 3, 2022

(30) Foreign Application Priority Data

Aug. 28, 2020 (CN) .......................... 202010886356.5

(51) Int. Cl.
*H01M 10/46* (2006.01)
*B60L 1/00* (2006.01)
(Continued)

(52) U.S. Cl.
CPC ............ *B60L 1/006* (2013.01); *H02J 7/0044* (2013.01); *H02J 50/005* (2020.01); *H02J 50/10* (2016.02);
(Continued)

(58) Field of Classification Search
CPC .... H02J 7/0044; H02J 7/0013; H02J 7/00034; H02J 7/0042; H02J 7/0047; H02J 50/005;
(Continued)

(56) References Cited

U.S. PATENT DOCUMENTS

2017/0025886 A1* 1/2017 Rohmer .................. H02J 50/00
2019/0027953 A1 1/2019 Rohmer et al.
2019/0312453 A1* 10/2019 Rohmer ................ H02J 7/0044

FOREIGN PATENT DOCUMENTS

CN 207218313 U 4/2018
CN 110077304 A 8/2019
(Continued)

OTHER PUBLICATIONS

Translation of KR-2018-0049920-A (Year: 2016).*
(Continued)

*Primary Examiner* — Edward Tso
(74) *Attorney, Agent, or Firm* — KIRTON McCONKIE; Evan R. Witt

(57) ABSTRACT

A vehicle-mounted charging device is provided. The vehicle-mounted charging device includes a main body unit, at least one wireless charging coil and a plurality of wired charging units. The main body unit receives an input power, and provides at least one wireless charging power and a plurality of wired charging powers. The wireless charging coil is coupled to the main body unit for receiving the corresponding wireless charging power, and the wireless charging coil charges a wireless electronic device disposed thereon through electromagnetic coupling. Each wired charging unit includes a wire and an input terminal and an output terminal which are located at two sides of the wire respectively. The input terminal is coupled to the main body unit for receiving the corresponding wired charging power. The wired charging power is transmitted to the output terminal so as to charge the wired electronic device connected to the output terminal.

20 Claims, 16 Drawing Sheets

(51) Int. Cl.
  *H02J 50/10* (2016.01)
  *H02J 50/00* (2016.01)
  *H02J 7/00* (2006.01)

(52) U.S. Cl.
  CPC ....... *H02J 2207/20* (2020.01); *H02J 2207/40* (2020.01); *H02J 2310/22* (2020.01); *H02J 2310/48* (2020.01)

(58) Field of Classification Search
  CPC ........ H02J 50/10; H02J 50/80; H02J 2310/48; H02J 2310/22; H02J 2207/20; H02J 2207/40; B60L 1/006
  USPC ................. 320/104, 108, 114, 115, 132, 150
  See application file for complete search history.

(56) References Cited

FOREIGN PATENT DOCUMENTS

| KR | 20180049920 A | * | 11/2016 | |
|---|---|---|---|---|
| KR | 20180049920 A | | 5/2018 | |
| WO | WO-2015077239 A1 | * | 5/2015 | ............... B60N 2/02 |
| WO | 2016037170 A1 | | 3/2016 | |

OTHER PUBLICATIONS

Volkswagen AG "1", Jan. 20, 2020, XP055876406, Wolfsburg, Retrieved from the Internet, Cited by the European Patent Office in the extended European search report for Application No. 21187169.4, dated Jan. 17, 2022.

* cited by examiner

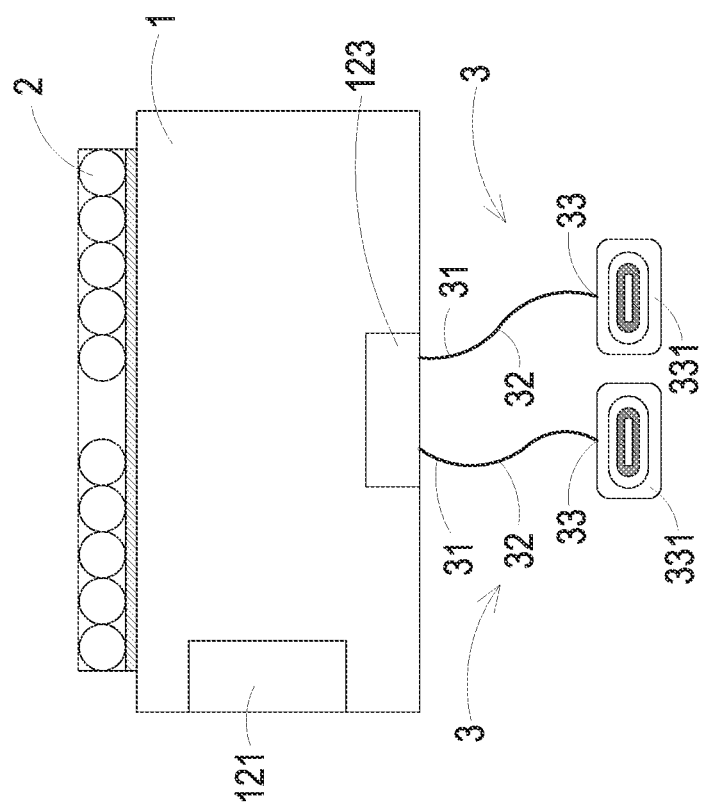

VEHICLE-MOUNTED CHARGING DEVICE

CROSS-REFERENCE TO RELATED APPLICATION

This application claims priority to China Patent Application No. 202010886356.5, filed on Aug. 28, 2020. The entire contents of the above-mentioned patent applications are incorporated herein by reference for all purposes.

FIELD OF THE INVENTION

The present disclosure relates to a charging device, and more particularly to a vehicle-mounted charging device.

BACKGROUND OF THE INVENTION

With the development of technology, various kinds of electronic products have become the necessaries in people's daily lives. Accordingly, the need of charging is increased. Corresponding to the present lifestyle, vehicle-mounted charging devices become more and more popular.

Conventionally, in order to satisfy the need for wired and wireless charging at the same time, usually there are wired and wireless chargers disposed in the vehicle for the front and rear passengers. Moreover, since the installation spaces in the front and rear parts of the vehicle are not completely the same, there may have different types of chargers.

Since the vehicle-mounted device is relative to the driving safety, the vehicle-mounted device has to go through a lot of certifications and tests during the development process, which requires a high cost. Therefore, the amount of the vehicle-mounted charger would greatly affect the cost. In addition, the charger not only includes the power wires for power supply but also includes the wires for communication and data transmission. Accordingly, the conventional vehicle-mounted charger leads to too many wires within the vehicle, which increases the cost and occupied volume and even affects the reliability.

Therefore, there is a need of providing a vehicle-mounted charging device to obviate the drawbacks encountered from the prior arts.

SUMMARY OF THE INVENTION

It is an objective of the present disclosure to provide a vehicle-mounted charging device that integrates the wired charging and the wireless charging. Consequently, the number of the wires between the vehicle-mounted charging device and the vehicle body is decreased, thereby reducing the cost and occupied volume and improving the reliability.

In accordance with an aspect of the present disclosure, there is provided a vehicle-mounted charging device. The vehicle-mounted charging device includes a main body unit, at least one wireless charging coil and a plurality of wired charging units. The main body unit receives an input power, converts the input power, and provides at least one wireless charging power and a plurality of wired charging powers. The wireless charging coil is coupled to the main body unit for receiving the corresponding wireless charging power, and the wireless charging coil charges a wireless electronic device disposed thereon through electromagnetic coupling. Each of the plurality of wired charging units includes a wire, an input terminal and an output terminal, and the input and output terminals are located at two sides of the wire respectively. The input terminal is coupled to the main body unit for receiving the corresponding wired charging power, and the wired charging power is transmitted to the output terminal so as to charge at least one wired electronic device connected to the output terminal.

BRIEF DESCRIPTION OF THE DRAWINGS

FIG. 1 is a schematic diagram illustrating a vehicle-mounted charging device according to a first embodiment of the present disclosure;

DETAILED DESCRIPTION OF THE PREFERRED EMBODIMENT

Figure 2A:
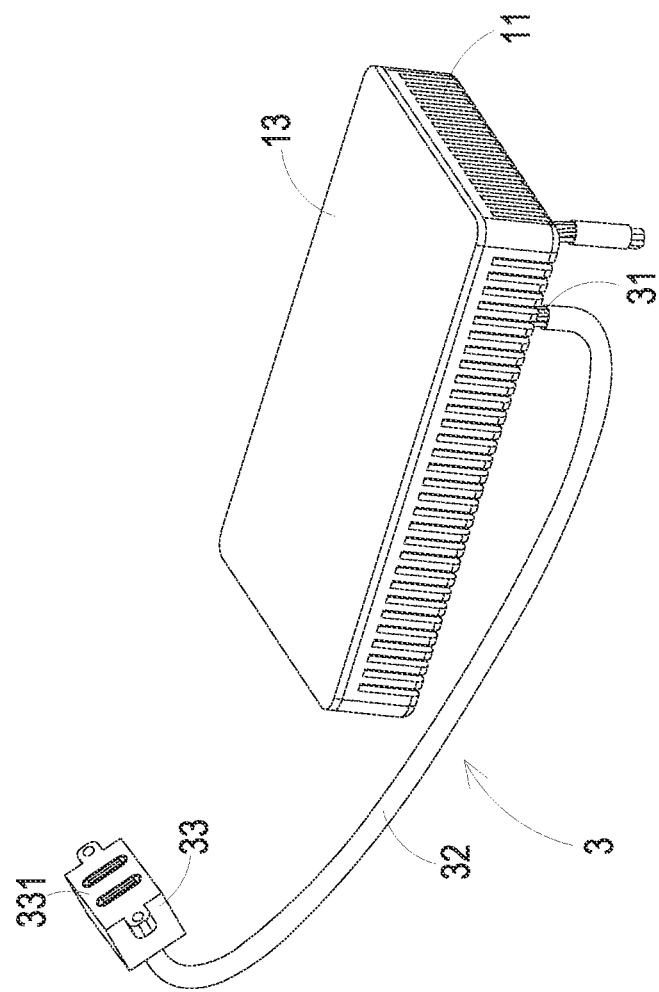
FIG. 2A is a schematic perspective view illustrating the vehicle-mounted charging device according to the first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

FIG. 1 is a schematic diagram illustrating a vehicle-mounted charging device according to a first embodiment of the present disclosure. As shown in FIG. 1, the vehicle-mounted charging device includes a main body unit 1, at least one wireless charging coil 2 and a plurality of wired charging units 3. In an embodiment, the number of the at least one wireless charging coil 2 is two, and the number of the plurality of wired charging units 3 is four. It is noted that the number of the at least one wireless charging coil 2 and the number of the plurality of wired charging units 3 are determined by actual requirements and are not limited thereto. The main body unit 1 receives and converts an input power so as to provide at least one wireless charging power and a plurality of wired charging powers. Each wireless charging coil 2 is coupled to the main body unit 1 for receiving the corresponding wireless charging power, and the wireless charging coil 2 charges a wireless electronic device disposed thereon through electromagnetic coupling. Each wired charging unit 3 has a wire 32, an input terminal 31 and an output terminal 33. The input and output terminals 31 and 33 are located at the two opposite sides of the wire 32 (i.e., the two opposite ends of the wire 32). The length of the wire 32 is longer than 10 cm and is preferably 30 cm, but not exclusively. The input terminal 31 is coupled to the main body unit 1 for receiving the corresponding wired charging power, and the received wired charging power is transmitted to the output terminal 33 through the wire 32 so as to charge a wired electronic device connected to the output terminal 33. In the present disclosure, the wireless electronic device represents the electronic device capable of being charged through wireless communication, and the wired electronic device represents the electronic device capable of being charged through wires. Further, one electronic device may be a wireless electronic device and a wired electronic device at the same time.

Consequently, the vehicle-mounted charging device of the present disclosure integrates the wired charging and the wireless charging, and the wires required for the power, communication and data transmission can be accommodated in the vehicle-mounted charging device. Therefore, the number of the wires between the vehicle-mounted charging device and the vehicle body is decreased, thereby reducing the cost and occupied volume and improving the reliability.

Figure 2B:
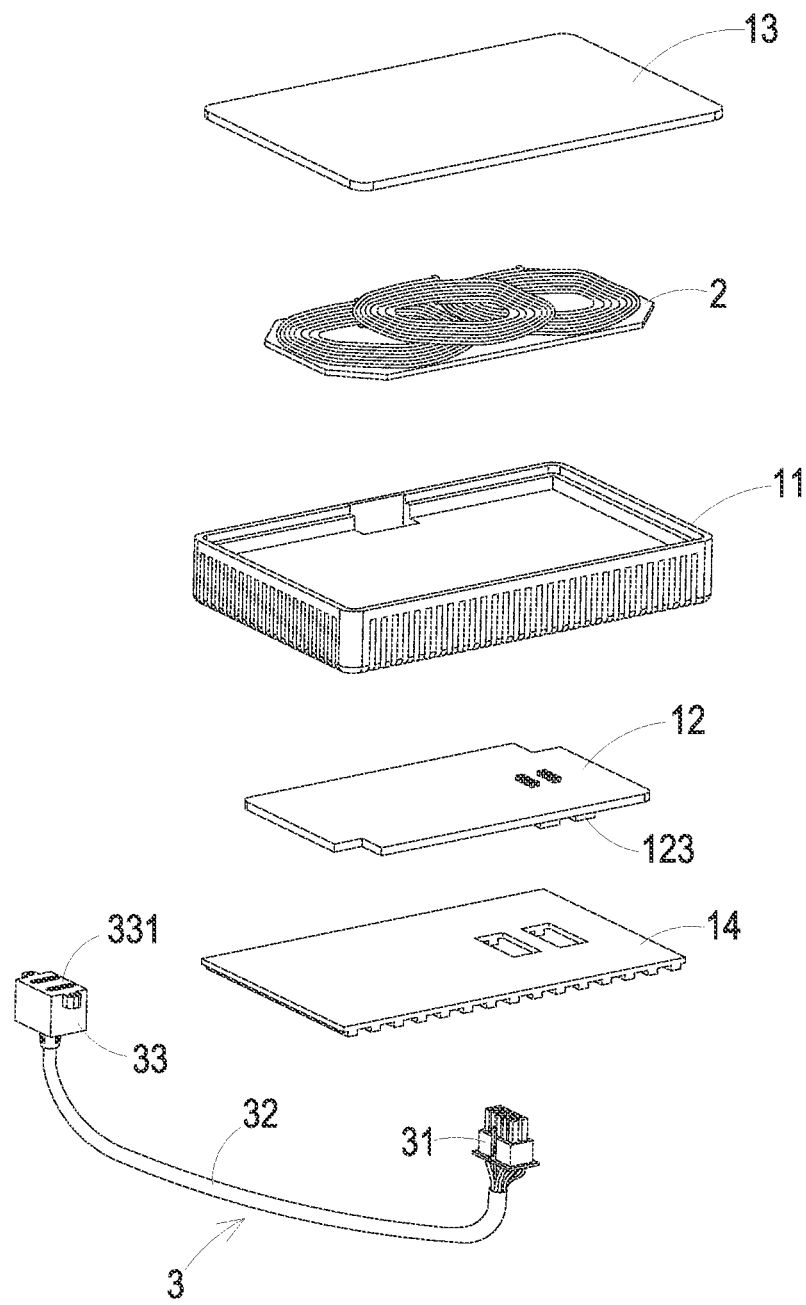
FIG. 2B is a schematic exploded view of the vehicle-mounted charging device of FIG. 2A.

FIG. 2A is a schematic perspective view illustrating the vehicle-mounted charging device according to the first embodiment of the present disclosure. FIG. 2B is a schematic exploded view of the vehicle-mounted charging device of FIG. 2A. As shown in FIG. 1, FIG. 2A and FIG. 2B, in an embodiment, the main body unit 1 includes a main housing 11 and a circuit board 12. The main housing 11 may be made of metal material or other materials having good heat-dissipation property. The main housing 11 defines and forms a first accommodation space, and the circuit board 12 is disposed in the first accommodation space. An input interface 121, at least one wireless charging interface, a plurality of wired charging interfaces 123 and a charging circuit are disposed on the circuit board 12. The input interface 121 is configured to receive the input power. The charging circuit is configured to convert the input power into wired and wireless charging powers and to provide the charging powers to the at least one wireless charging interface and the plurality of wired charging interfaces 123. Each wireless charging coil 2 is coupled to the corresponding wireless charging interface for receiving the corresponding wireless charging power. The input terminal 31 of each wired charging unit 3 is coupled to the corresponding wired charging interface 123 for receiving the corresponding wired charging power. In an embodiment, the main housing 11 further defines and forms a second accommodation space, and the wireless charging coil 2 is disposed in the second accommodation space. In an embodiment, the main body unit 1 further includes a top cover 13 and a bottom cover 14. The top cover 13 is assembled to the main housing 11 to define the second accommodation space collaboratively, and the bottom cover 14 is assembled to the main housing 11 to define the first accommodation space collaboratively.

Figure 3A:
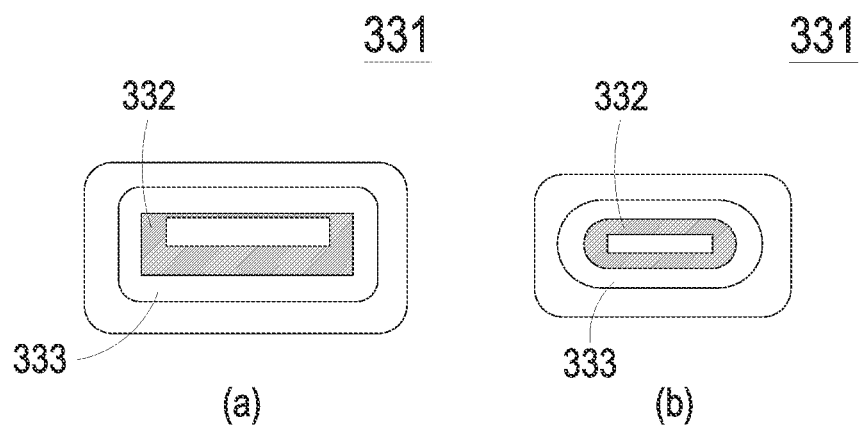
FIG. 3A and FIG. 3B are schematic diagrams showing different variants of a fixing component of a wired charging unit of the present disclosure.
Figure 3B:
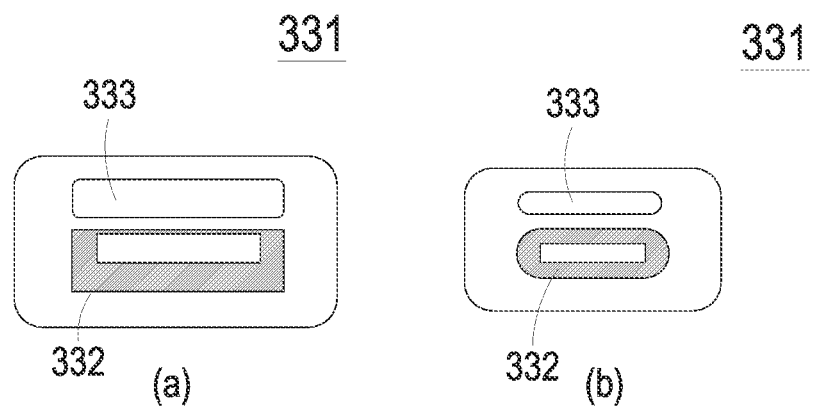

In addition, the output terminal 33 of the wired charging unit 3 includes the fixing component 331 shown in FIG. 3A. At least one device interface 332 and at least one indicator 333 are disposed on the fixing component 331. The device interface 332 is configured to connect to the wired electronic device, and the actual implementation of the device interface 332 is not limited. For example but not exclusively, the device interface 332 is a Type-A USB (universal serial bus) connector shown in part (a) of FIG. 3A or a Type-C USB connector shown in part (b) of FIG. 3A. The indicator 333 is disposed neighboring to the corresponding device interface 332, and the indicator 333 is configured to indicate the position of the device interface 332. Preferably but not exclusively, the indicator 333 is a light emitting element, thereby indicating the position of the device interface 332 through emitting light. Further, a driver is disposed on the circuit board 12 for driving the indicator 333. In addition, the actual disposing position of the indicator 333 is not limited. For example, as shown in FIG. 3A, the indicator 333 may be disposed around the device interface 332. Alternatively, as shown in FIG. 3B, the indicator 333 may be disposed close to one side of the device interface 332.

Figure 4:
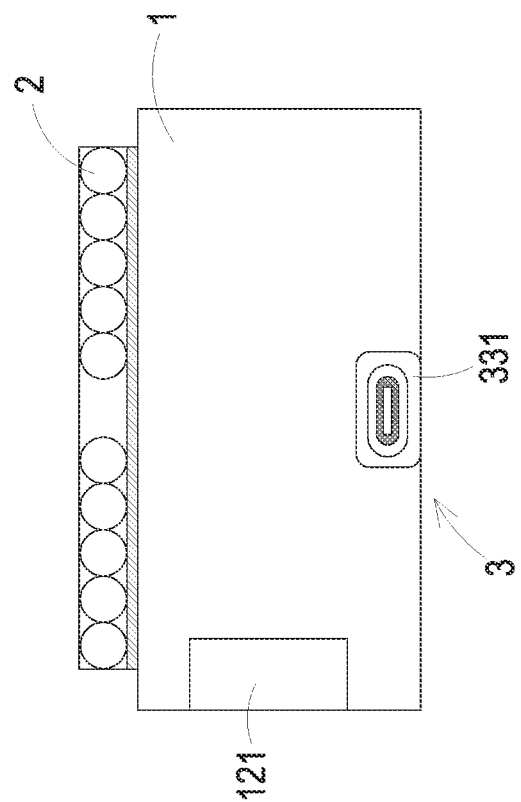
FIG. 4 is a schematic diagram illustrating a vehicle-mounted charging device according to a second embodiment of the present disclosure.
Figure 5:
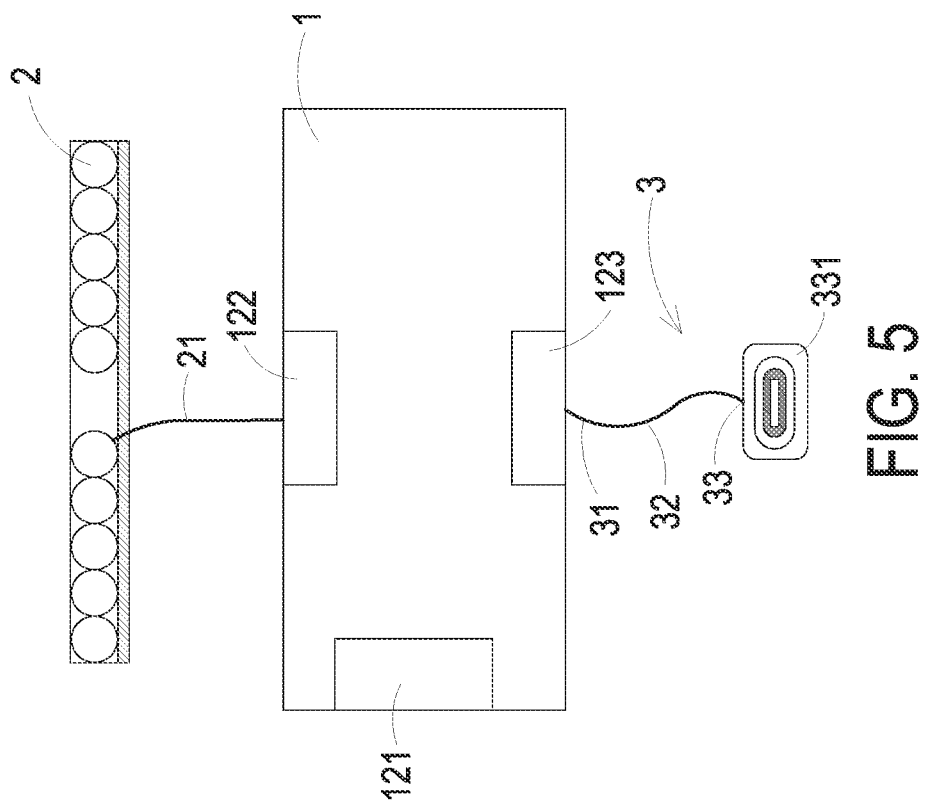
FIG. 5 is a schematic diagram illustrating a vehicle-mounted charging device according to a third embodiment of the present disclosure.
Figure 6:
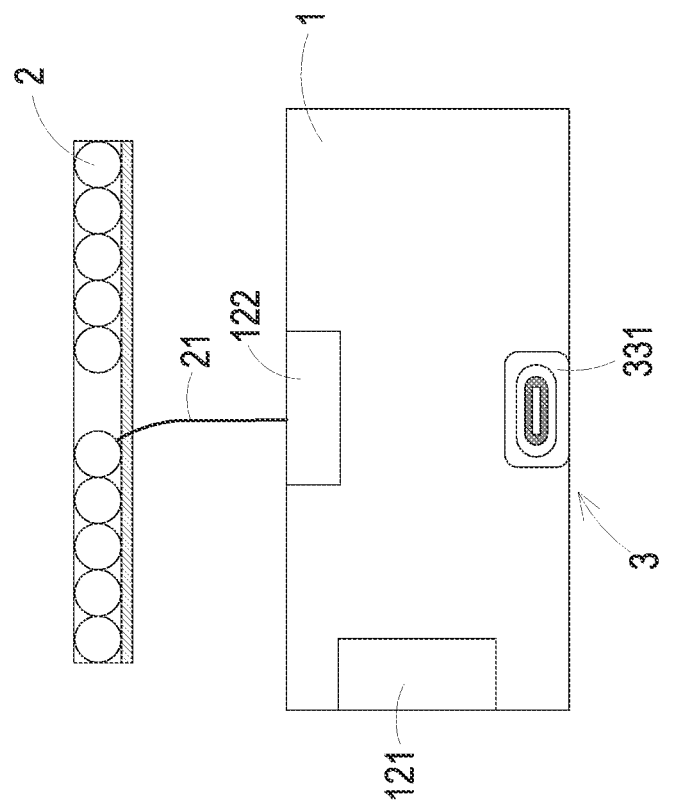
FIG. 6 is a schematic diagram illustrating a vehicle-mounted charging device according to a fourth embodiment of the present disclosure.

In the first embodiment shown in FIG. 1, the wired charging unit 3 is located in the space outside the main housing 11 of the main body unit 1, and the wired charging unit 3 receives the wired charging power through the wire 32. The wireless charging coil 2 is disposed in the second accommodation space inside the main housing 11. Actually, the disposing position of the wire charging unit 3 is not limited thereto. In the second embodiment shown in FIG. 4, the fixing component 331 of the wired charging unit 3 can be disposed on the main housing 11 of the main body unit 1. Under this circumstance, the wire 32 of the wired charging unit 3 can be accommodated inside the main housing 11. Similarly, in the third and fourth embodiments shown in FIG. 5 and FIG. 6 respectively, the wireless charging coil 2 can be disposed in the space outside the main housing 11 of the main body unit 1, and the wireless charging coil 2 receives the corresponding wireless charging power through the wire 21 coupled to the wireless charging interface 122. It is noted that both the wired charging unit 3 and the wireless charging coil 2 receive the required power from the main body unit 1 and do not need to directly connect to the power source of vehicle body. Therefore, even if the number of the wired charging unit 3 and wireless charging coil 2 is increased, the number of the wires between the vehicle body and the vehicle-mounted charging device would not be affected. Moreover, the disposing positions of the wired charging unit 3 and the wireless charging coil 2 can be varied flexibly through adjusting the wires 32 and 21. Consequently, it is more convenient for the passengers to charge the electronic devices.

Figure 7:
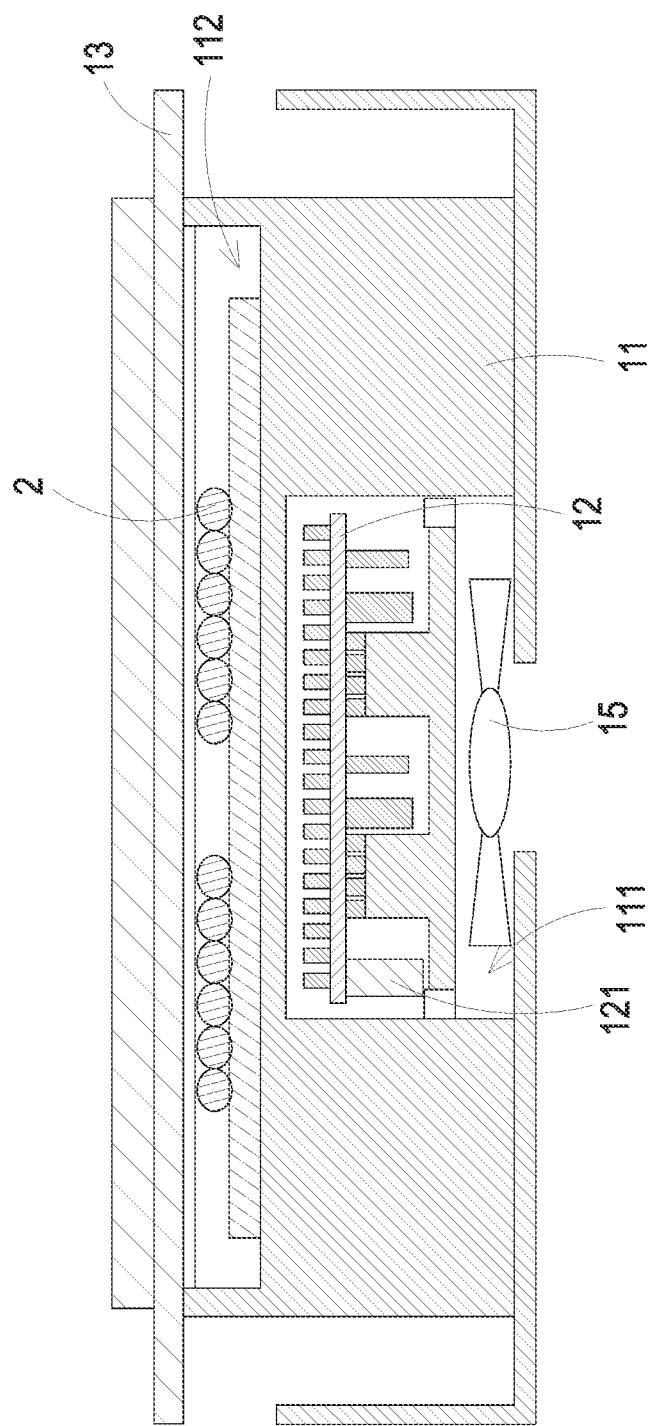
FIG. 7 is a schematic sectional view of a partial structure of a vehicle-mounted charging device according to an embodiment of the present disclosure.
Figure 8:
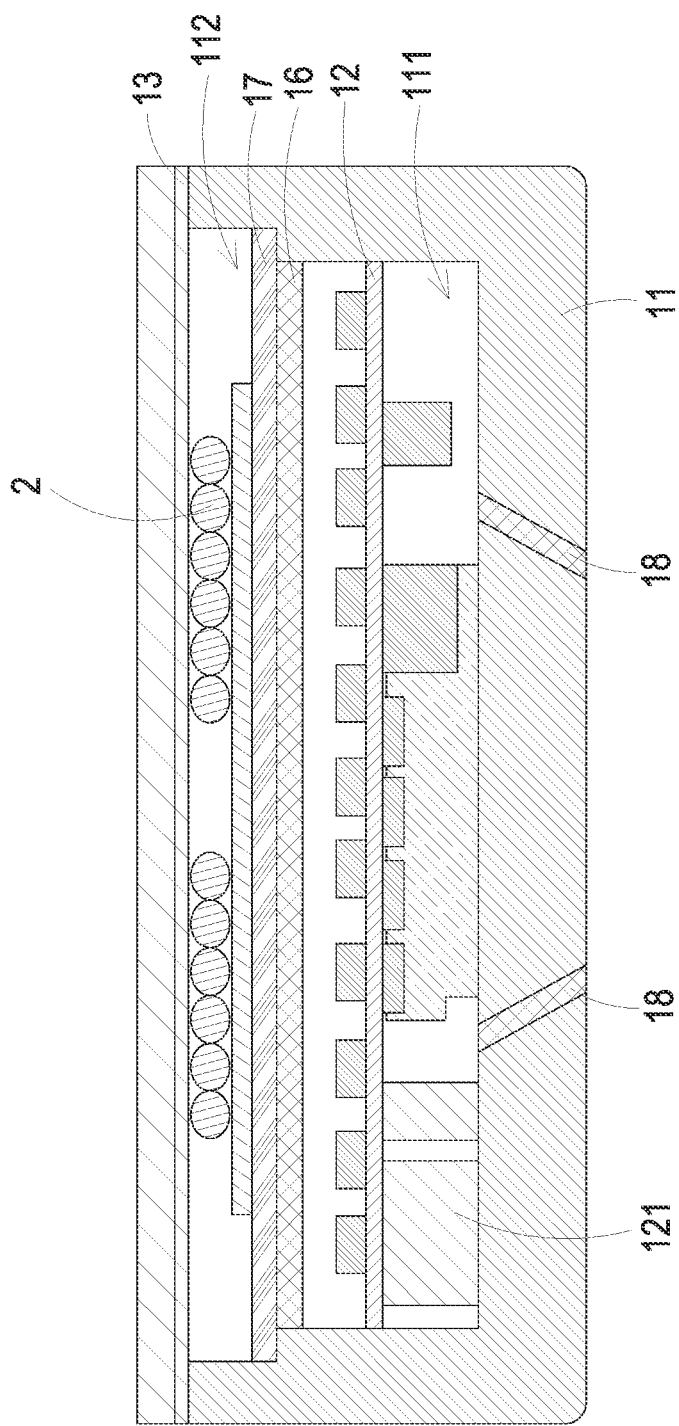
FIG. 8 is a schematic sectional view of a partial structure of a vehicle-mounted charging device according to another embodiment of the present disclosure.

In an embodiment, as shown in FIG. 7, the main body unit 1 further includes a main heat dissipation element 15. The main heat dissipation element 15 is disposed corresponding to the circuit board 12 and is configured to dissipate the heat of the main housing 11 and the circuit board 12. The actual disposing position of the main heat dissipation element 15 is not limited. For example, the main heat dissipation element 15 may be disposed in the first accommodation space 111, or the main heat dissipation element 15 may be disposed on the external surface of the main housing 11. In addition, the main heat dissipation 15 is for example but not limited to a fan, so as to dissipate heat actively. In an embodiment, as shown in FIG. 8, when the wireless charging coil 2 is disposed in the second accommodation space 112, the first and second accommodation spaces 111 and 112 are thermally insulated from each other by the heat insulation material 16. Further, the heat insulation material 16 is disposed corresponding to the circuit board 12 so that the heat on the circuit board 12, which is mainly generated by power components, is blocked from being transferred to the second accommodation space 112. In specific, the edge of the heat insulation material 16 is closely attached to the inner wall of the main housing 11, so as to block the heat generated by the power components on the circuit board 12 from being transferred to the second accommodation space 112. Accordingly, the heat on the circuit board 12 is blocked from being transferred to the wireless charging coil 2, which can reduce the temperature increment of the wireless electronic device (e.g., smart phone or tablet computer) disposed on the wireless charging coil 2. Therefore, the user experience is enhanced. In addition, the main body unit 1 may further include a coil heat dissipation element 17, the inner surface of the main housing 11 has a step structure, and the coil heat dissipation element 17 is disposed on the step structure. Under this circumstance, the first and second accommodation spaces 111 and 112 are in communication with each other, thus the coil heat dissipation element 17 can transfer the heat generated by the wireless charging coil 2 to the main housing 11 for realizing the heat dissipation. In an embodiment, the first and second accommodation spaces 111 and 112, which are formed by the main housing 11, are not in communication with each other and are separated by the main housing 11. The coil heat dissipation element 17 is disposed on the bottom of the second accommodation space 112 and is contacted with the main housing 11, so as to transfer the heat generated by the wireless charging coil 2 to the main housing 11. In an embodiment, the first and second accommodation spaces 111 and 112 are thermally insulated from each other by air, thereby blocking the heat on the circuit board 12 from being transferred to the second accommodation space 112.

In an embodiment, since the heat on the circuit board 12 would be transferred to the main housing 11, a heat insulation element 18 is embedded at the position of the main housing 11 which is corresponding to the heat source of the circuit board 12. Consequently, the heat from the circuit board 12 is limited in the specific region of the main housing 11 by the heat insulation element 18, thus the heat on the circuit board 12 is prevented from being transferred to the second accommodation space 112 in which the wireless charging coil 2 is disposed through the main housing 11.

Figure 9:
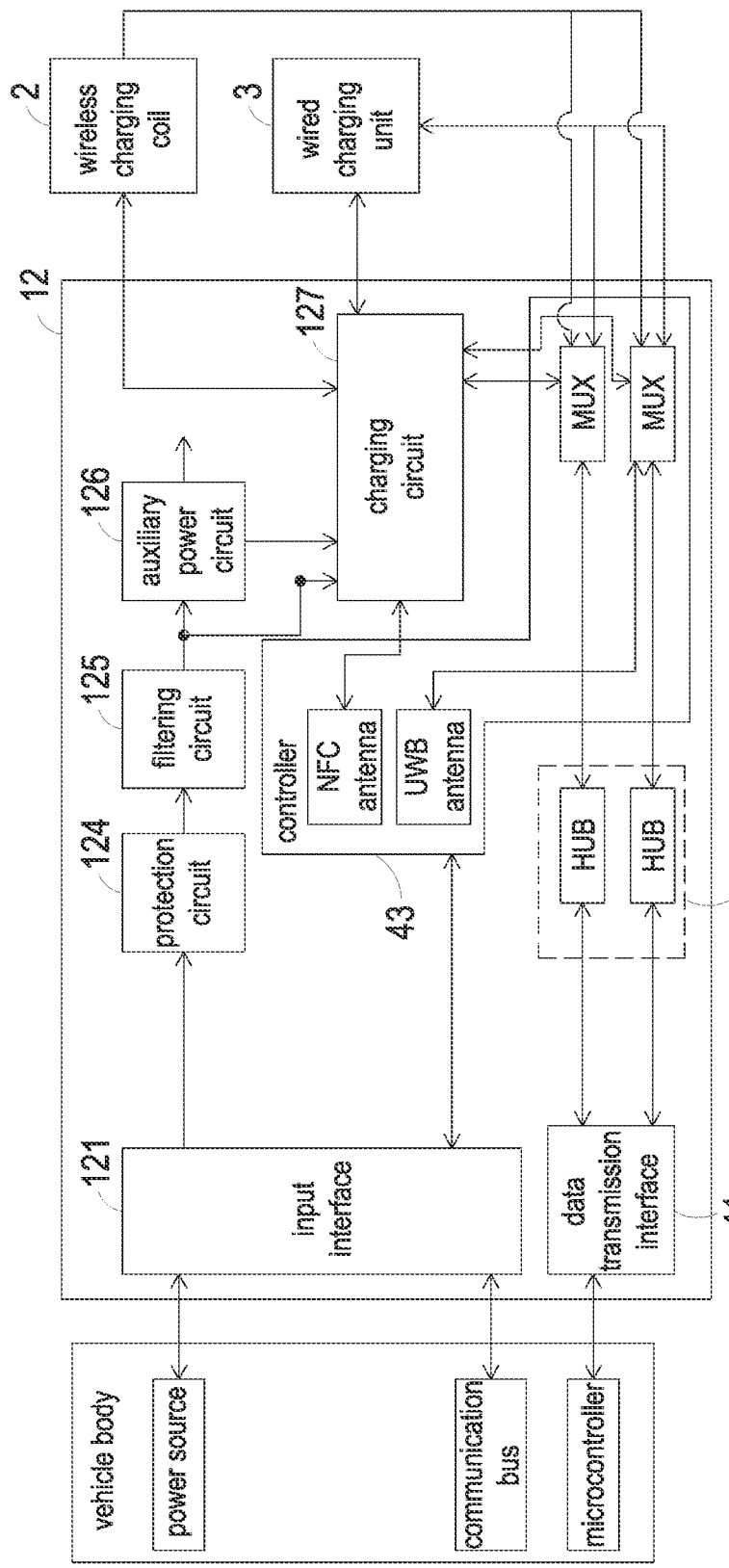
FIG. 9 is a schematic circuit diagram illustrating a vehicle-mounted charging device according to an embodiment of the present disclosure.

FIG. 9 is a schematic circuit diagram illustrating a vehicle-mounted charging device according to an embodiment of the present disclosure. As shown in FIG. 9, the input interface 121 on the circuit board 12 is connected to the power source in the vehicle body for receiving the input power. Further, a protection circuit 124, a filtering circuit 125 and an auxiliary power circuit 126 are disposed on the circuit board 12. The protection circuit 124 is electrically connected between the input interface 121 and the filtering circuit 125. For example but not exclusively, the protection circuit 124 is utilized for transient protection or reverse protection. The filtering circuit 125 is electrically connected to the charging circuit 127 and the auxiliary power circuit 126, and the filtering circuit 125 is for example but not limited to an electromagnetic interference (EMI) filtering circuit. The auxiliary power circuit 126 is utilized to provide the auxiliary power. The filtering circuit 125 and the auxiliary power circuit 126 are connected to the charging circuit 127 respectively. In an embodiment, the charging circuit 127 is further connected to the communication bus in the vehicle body through the input interface 121 so as to transmit the communications protocol. Further, through the connection between the communication bus and the input interface 121, the charging circuit 127 can communicate with the vehicle body. In an embodiment, there are further a data transmission interface 41, a data transmission circuit 42 and a communication controller 43 disposed on the circuit board 12. The data transmission interface 41 is connected to the microcontroller in the vehicle body and the data transmission circuit 42 through the data transmission line. The data transmission circuit 42 is connected to the communication controller 43 through the data transmission line. The communication controller 43 is connected to the charging circuit 127, the wireless charging coil 2 and the wired charging unit 3. The communication controller 43 is configured for controlling the wireless charging coil 2 to process the wireless charging, the communication and the data transmission. The communication controller 43 may include an antenna (e.g., NFC or UWB antenna, but not exclusively), a plurality of multiplexers MUX and corresponding control elements so as to excite the modulation and demodulation of the wireless charging coil 2. When the wireless electronic device is disposed on the wireless charging coil 2, the wireless electronic device communicates and transmits data with the vehicle terminal through the wireless charging coil 2, the communication controller 43, the charging circuit 127 and the data transmission circuit 42. The NFC and UWB antennas and control elements thereof communicates with the vehicle body for realizing the highly confidential data transmission, such as the functions like keyless access and identification. When the wired electronic device is connected to the wired charging unit 3, the wired electronic device communicates and transmits data with the vehicle terminal through the wired charging unit 3, the data transmission circuit 42, the charging circuit 127 and the communication controller 43. In an embodiment, the data transmission circuit 42 includes a plurality of hubs HUB connected with the plurality of multiplexers MUX respectively. One of the hubs HUB is utilized for high-speed data transmission, for example but not limited to the data transmission with a transmission speed higher than 500 Mbps. For example, USB 3.0 protocol, USB 3.1 protocol and USB 4.0 protocol require high-speed data transmission, and the transmitted data for all protocols are collected and communicated with the vehicle body through the corresponding hub HUB, so as to realize the function of complicated data interaction such as Carplay. The wire 32 of each wired charging unit 3 includes transmitting data line Tx and receiving data line Rx. Through high-speed data transmission through the hub HUB, the number of the data lines is greatly reduced without affecting the performance of data transmission, and the user experience is enhanced as well. One of the hubs HUB is utilized for low-speed data transmission, for example but not limited to the data transmission with a transmission speed lower than 500 Mbps. For example, USB 2.0 protocol requires low-speed data transmission, and the transmitted data is collected and communicated with the vehicle body through the corresponding hub HUB. Therefore, the data interaction function requiring low-speed transmission is realized, and the number of the data lines is greatly reduced.

According to the above embodiments, the vehicle-mounted charging device of the present disclosure can realize the wired charging, the wireless charging, the data interaction and the vehicle network communication. Moreover, the number of the power, data and communication transmission lines is reduced, and the number of the wires and connectors is reduced as well. Therefore, the miniaturization and integration of the vehicle-mounted product are realized, the cost of material is reduced, and the wiring is simplified. Further, the flexibility of installation and the reliability of the vehicle-mounted charging device are improved, and the user experience is enhanced.

Figure 10:
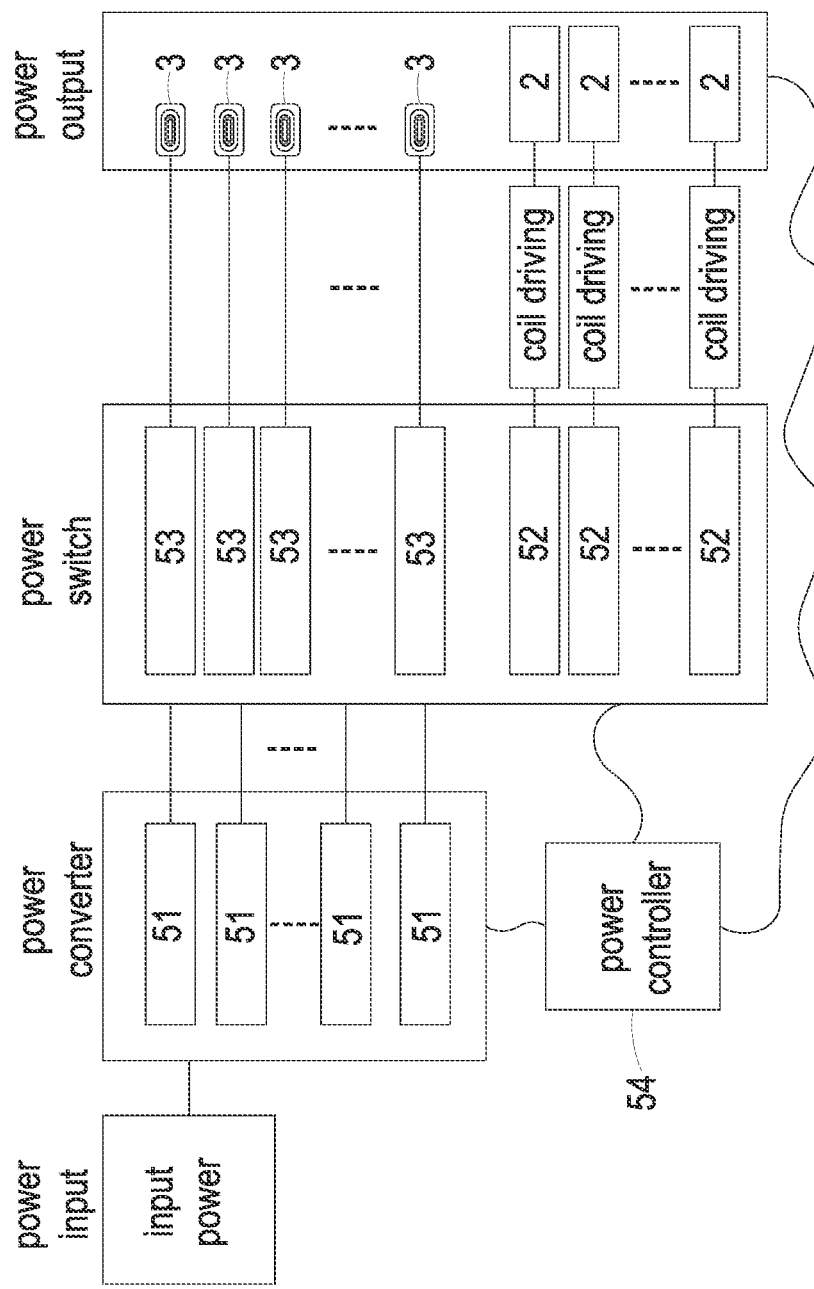
FIG. 10 is a schematic circuit diagram illustrating the charging circuit of FIG. 9.

FIG. 10 is a schematic circuit diagram illustrating the charging circuit of FIG. 9. As shown in FIG. 10, the charging circuit 127 includes a plurality of power converters 51, a plurality of power switches and a power controller 54. The plurality of power converters 51 is configured to convert the input power. The plurality of power switches includes at least one wireless power switch 52 and a plurality of wired power switch 53. The wireless power switch 52 is corresponding to the wireless charging coil 2 one-to-one, and the wired power switch 53 is corresponding to the wired charging unit 3 one-to-one. The power controller 54 provides the wireless and wired charging powers to the wireless charging coil 2 and the wired charging unit 3 respectively through the power converter 51 and the power switches. The number of the power converters 51 is smaller than the number of the power switches and is larger than or equal to the number of the wireless charging coil 2. Since the power converters for the wireless and wired charging are the similar type and have the similar voltage level, the power converters 51 can be shared for the wireless and wired charging to a certain extent so as to reduce the cost by reducing the number of the power converters 51. In addition, the number of the power converters 51 is not smaller than the number of the wireless charging coils 2 so as to ensure that all the wireless charging coils 2 can perform the charging operation at the same time. The terminal protocol can be adjusted flexibly so as to reduce the number of protocol chips and further reduce the cost. In the plurality of power converters 51, at least one power converter 51 is a buck non-isolated DC-DC power converter. The buck non-isolated DC-DC power converter may be a buck converter capable of outputting a current larger than or equal to 3 A. Namely, the buck converter can at least provide charging power for two electronic devices with a normal rated current of 1.5 A. Alternatively, the buck converter can provide power for a plurality of wireless charging pings. In an embodiment, at least one power converter 51 is a buck boost power converter, such as a buck boost converter, so as to reduce the amount of type of the converter. The plurality of power converters 51 include buck boost converters and buck converters. Some buck boost converters preferentially provide the wireless charging power to the wireless charging coils for charging the corresponding wireless electronic devices. The other buck boost converters provide the wired charging power to the device interface(s) which has priority for charging the corresponding wired electronic devices. The voltage of the device interface(s) which doesn't have priority is limited to 5V, namely the buck converter converts the input power into the voltage of 5V and provides it to the device interface(s) which doesn't have priority. It is noted that the voltage acquired by the wireless charging ping may be limited to 5V if there is no wireless electronic device disposed on the wireless charging coil.

In addition, the power of the wired and wireless charging can be controlled and distributed by the power controller 54. For example, in an embodiment, the power controller 54 may provide the wireless and wired charging powers to the wireless charging coil 2 and the wired charging unit 3 which have the priority respectively, according to their needs. The power controller 54 provides the specific charging power (such as the voltage of 5V) to the other wireless charging coil 2 and the other wired charging unit 3. In another embodiment, according to the needs of the wireless charging coil 2 and the wired charging unit 3, the power controller 54 equally distributes the wireless and wired charging powers to the wireless charging coils 2 and the wired charging units 3. Certainly, the power controller 54 can be connected to the human machine interface, for example but not limited to a display screen in the vehicle body or an application of the mobile device. Accordingly, the user can control the operation of the power controller 54 through the human machine interface, thereby adjusting the distribution of the wired and wireless charging powers in real time. Through controlling and distributing the power of the wired and wireless charging by the power controller 54, the power of the input power doesn't need to be designed as full power. As an example, the power of the input power may be K times of the total output power.

Figure 11A:
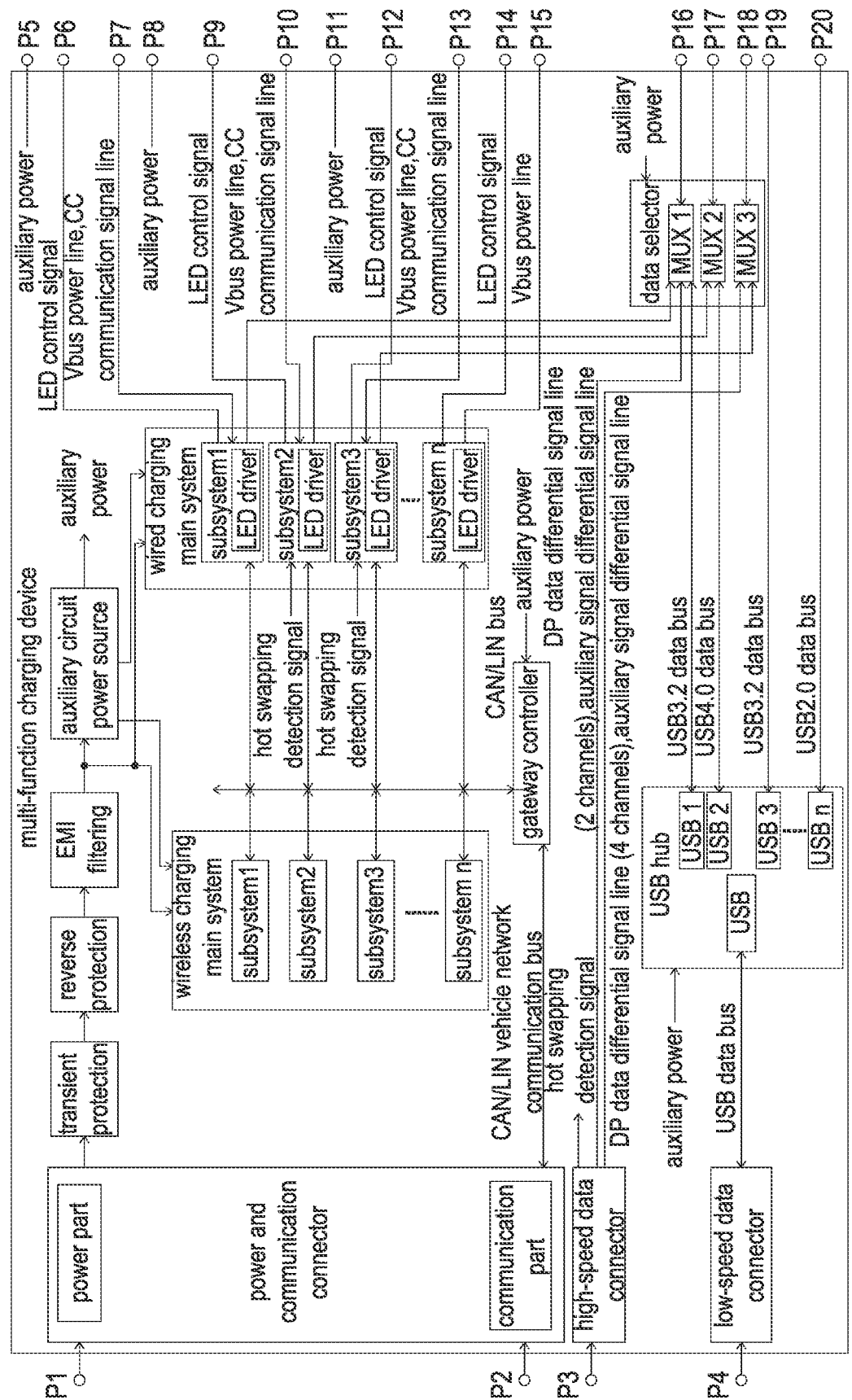
FIG. 11A and FIG. 11B are schematic diagrams illustrating the actual implementation of the vehicle-mounted charging device of FIG. 9.
Figure 11B:
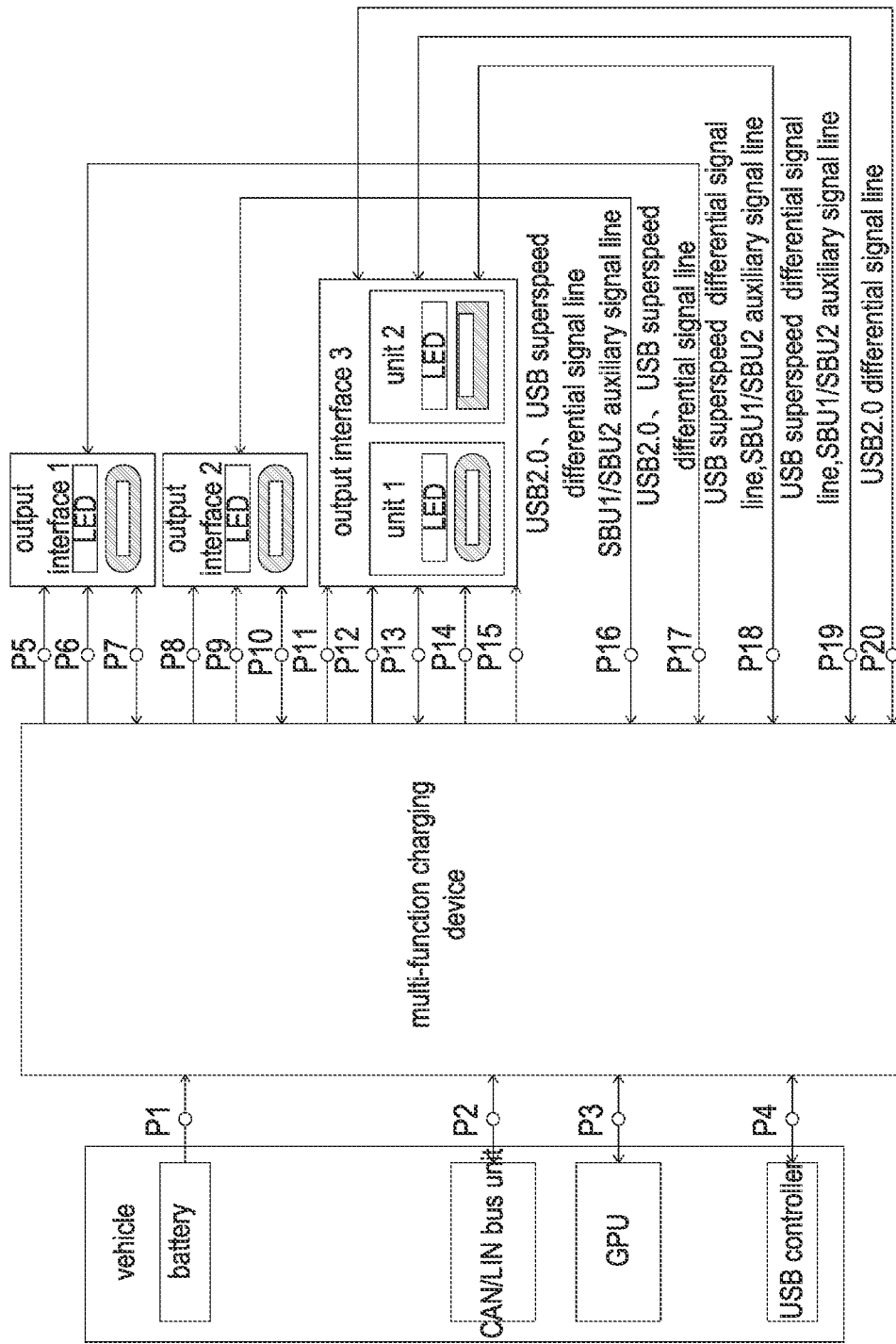

For easily understanding the actual way of applying the vehicle-mounted charging device of the present disclosure, a kind of actual implementation is exemplified in FIG. 11A and FIG. 11B, but not limited thereto. As shown in FIG. 11A and FIG. 11B, the components disposed on the circuit board 12 of the vehicle-mounted charging device form a multi-function charging device. The input interface 121 is a power and communication connector. A power part of the input interface 121 is connected between the battery of the vehicle and the protection circuit 124, and a communication part of the input interface 121 is connected between a CAN/LIN bus control unit and a gateway controller. The protection circuit 124 specifically includes a transient protection and a reverse protection. The filtering circuit 125 performs an EMI filtering. The charging circuit 127 includes wireless and wired charging main systems that both include a plurality of subsystems, and all the subsystems are connected to the gateway controller for processing the communication transmission. The wired charging unit 3 includes an output interface, and the output interface can receive the Vbus power, the CC communication signal, the auxiliary power etc. from the corresponding wired charging main system. Moreover, the subsystem of the wired charging main system includes an LED driver so as to provide an LED control signal for the corresponding LED on the output interface. The data transmission interface 41 includes a high-speed data connector and a low-speed data connector. The high-speed data connector is connected between the GPU (graphics processing unit) of the vehicle and the data selector including plural multiplexers. The low-speed data connector is connected between the USB controller of the vehicle and the USB hub. The USB hub is connected to the data selector. The data selector is connected to the output interface of the wired charging unit 3 through the plurality of multiplexers. The connection line between the multiplexer and the output interface may be a USB superspeed differential signal line, a USB 2.0 high-speed differential signal line, SBU1/SBU2 auxiliary signal line, etc. In addition, the output interface of the wired charging unit 3 may be directly connected the USB hub. The types of the signal and connection lines among the components are exemplified and designated in FIG. 11A and FIG. 11B.

Figure 12A:
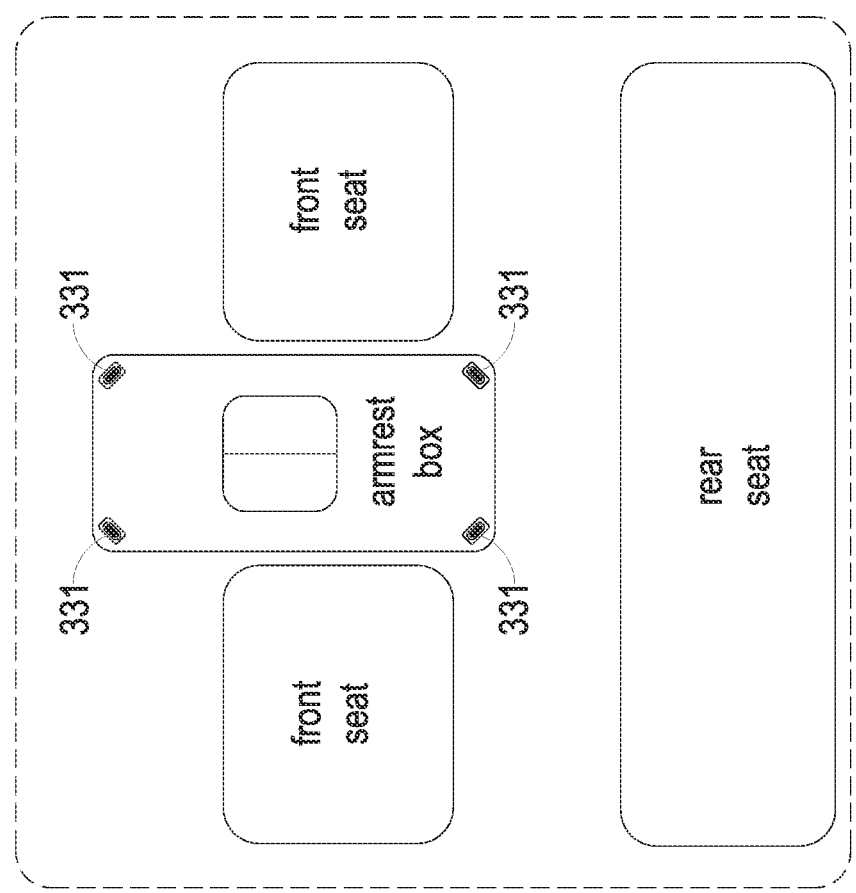
FIG. 12A is a schematic diagram showing the disposition of mounting the vehicle-mounted charging device in a vehicle according to an embodiment of the present disclosure.
Figure 12B:
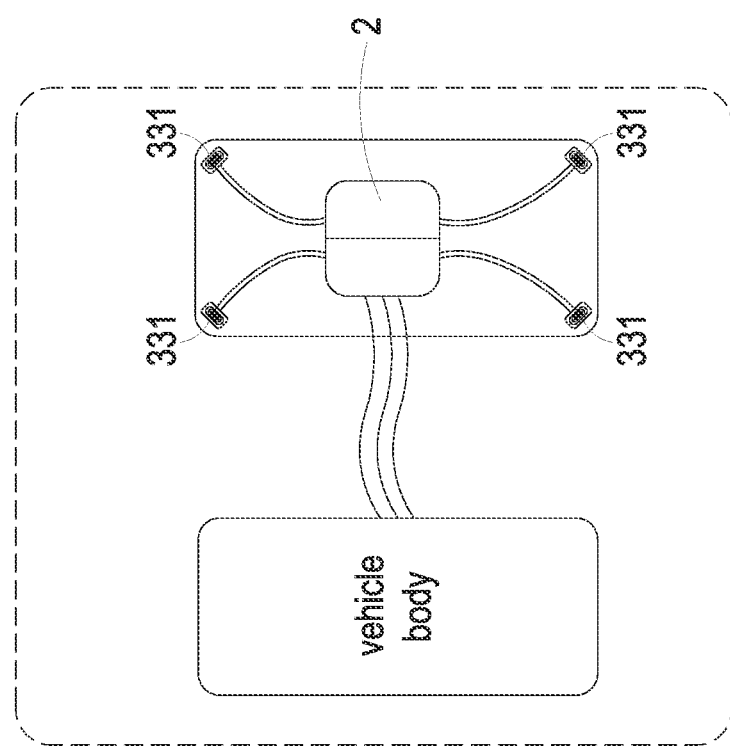
FIG. 12B is a schematic diagram showing the wiring between the vehicle-mounted charging device of the present disclosure and the vehicle body.
Figure 13:
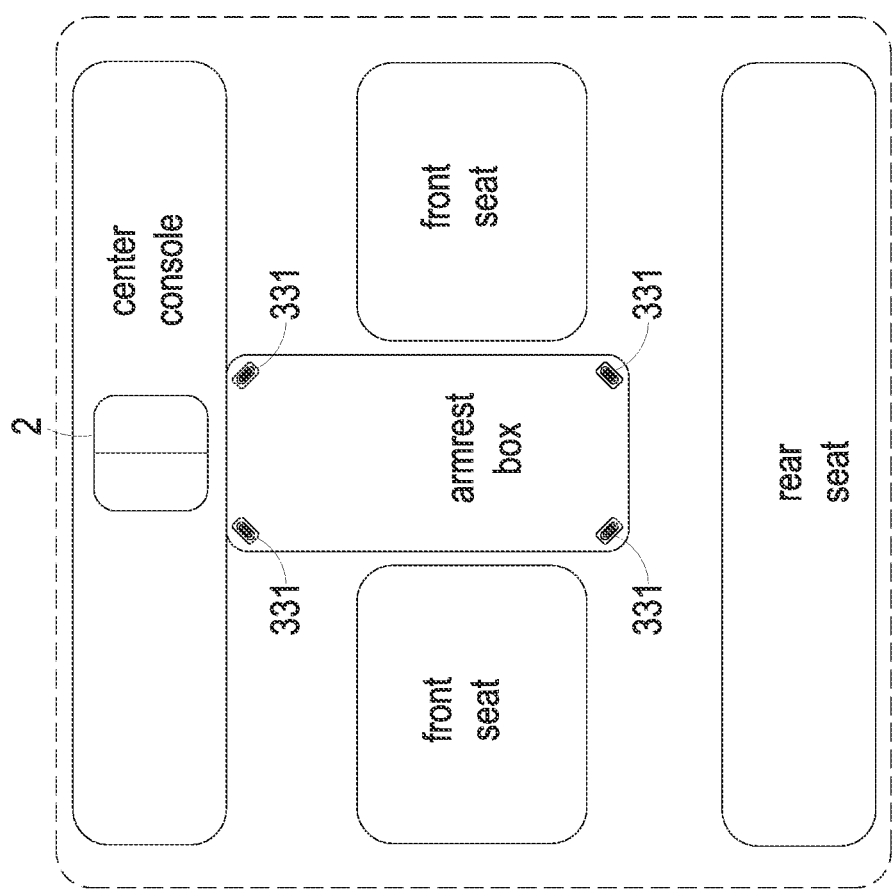
FIG. 13 is a schematic diagram showing the disposition of mounting the vehicle-mounted charging device in a vehicle according to another embodiment of the present disclosure.

FIG. 12A is a schematic diagram showing the disposition of mounting the vehicle-mounted charging device in a vehicle according to an embodiment of the present disclosure. FIG. 12B is a schematic diagram showing the wiring between the vehicle-mounted charging device of the present disclosure and the vehicle body. As shown in FIG. 12A, the vehicle-mounted charging device is mounted in the vehicle. The vehicle includes two front seats, a rear seat and an armrest box, and the armrest box is located between the two front seats. The wireless charging coil 2 and the wired charging unit 3 are disposed on the armrest box. Preferably but not exclusively, the fixing components 331 of the plurality of wired charging units 3 are equally distributed and fixed on the periphery of the armrest box, such as the four corners of the armrest box. Therefore, it is convenient for the passengers on the front and rear seats to charge electronic devices. The wireless charging coil 2 is located in the middle of the armrest box. The connections between the vehicle-mounted charging device and the vehicle body are shown as FIG. 12B. There are only three wires between the vehicle-mounted charging device and the vehicle body for performing the power, communication and data transmissions. All the wires needed by the wireless charging coil 2 and the wired charging unit 3 can be accommodated in the vehicle-mounted charging device. In an embodiment, as shown in FIG. 13, the vehicle further includes a center console, and the wireless charging coil 2 is adjusted to be disposed on the center console.

From the above descriptions, the present disclosure provides a vehicle-mounted charging device that integrates the wired and wireless charging. Consequently, the number of the wires between the vehicle-mounted charging device and the vehicle body is decreased, thereby reducing the cost and occupied volume and improving the reliability. Further, through the vehicle-mounted charging device of the present disclosure, the flexibility and accessibility of charging are improved, and the power and protocol can be managed flexibly.

While the disclosure has been described in terms of what is presently considered to be the most practical and preferred embodiments, it is to be understood that the disclosure needs not be limited to the disclosed embodiment.

What is claimed is:

1. A vehicle-mounted charging device, comprising:
   a main body unit receiving an input power, converting the input power, and providing at least one wireless charging power and a plurality of wired charging powers;
   at least one wireless charging coil, wherein the wireless charging coil is coupled to the main body unit for receiving the corresponding wireless charging power, and the wireless charging coil charges a wireless electronic device disposed thereon through electromagnetic coupling; and
   a plurality of wired charging units, wherein each of the plurality of wired charging units comprises a wire, an input terminal and an output terminal, the input and output terminals are located at two sides of the wire respectively, the input terminal is coupled to the main body unit for receiving the corresponding wired charging power, and the wired charging power is transmitted to the output terminal so as to charge at least one wired electronic device connected to the output terminal,
   wherein the main body unit comprises a power controller configured to control the at least one wireless charging power and the plurality of wired charging powers in a first mode or a second mode,
   in the first mode, the power controller provides the wireless charging power to the wireless charging coil which has priority of the at least one wireless charging coil according to its need, and the power controller provides the wired charging power to the wired charging unit which has priority of the plurality of wired charging units according to its need, and
   in the second mode, according to needs of the at least one wireless charging coil and the plurality of wired charging units, the power controller equally distributes the at least one wireless charging power and the plurality of wired charging powers to the at least one wireless charging coil and the plurality of wired charging units respectively.

2. The vehicle-mounted charging device according to claim 1, wherein the main body unit comprises a main housing and a circuit board, the main housing defines and forms a first accommodation space, the circuit board is disposed in the first accommodation space, wherein an input interface and a charging circuit are disposed on the circuit board, the input interface is configured to receive the input power, and the charging circuit is configured to convert the input power into the at least one wireless charging power and the plurality of wired charging powers.

3. The vehicle-mounted charging device according to claim 2, wherein at least one wireless charging interface is disposed on the circuit board, and the wireless charging coil is coupled to the corresponding wireless charging interface for receiving the corresponding wireless charging power.

4. The vehicle-mounted charging device according to claim 2, wherein the at least one wireless charging coil is disposed in a space outside the main housing.

5. The vehicle-mounted charging device according to claim 2, wherein a plurality of wired charging interface are disposed on the circuit board, and the input terminal of each of the plurality of wired charging units is coupled to the corresponding wired charging interface for receiving the corresponding wired charging power.

6. The vehicle-mounted charging device according to claim 5, wherein the output terminal of each of the plurality of wired charging units comprises a fixing component, at least one device interface and at least one indicator are disposed on the fixing component, the at least one indicator is disposed neighboring to the at least one device interface and is configured to indicate a position of the at least one device interface, and the device interface is configured to assemble with the wired electronic device.

7. The vehicle-mounted charging device according to claim 6, wherein the indicator is a light emitting element configured to indicate the position of the device interface through emitting light, and a driver is disposed on the circuit board and is configured to drive the at least one indicator.

8. The vehicle-mounted charging device according to claim 6, wherein the fixing component is disposed on the main housing.

9. The vehicle-mounted charging device according to claim 2, wherein the charging circuit comprises a plurality of power converters, a plurality of power switches and the power controller, the plurality of power switches are corresponding to the at least one wireless charging coil and the plurality of wired charging units one-to-one, the plurality of power converters is configured to convert the input power, and the power controller provides the at least one wireless charging power and the plurality of wired charging powers to the at least one wireless charging coil and the plurality of wired charging units respectively through controlling the plurality of power converters and the plurality of power switches.

10. The vehicle-mounted charging device according to claim 9, wherein a number of the plurality of power converters is smaller than a number of the plurality of power switches.

11. The vehicle-mounted charging device according to claim 9, wherein a number of the plurality of power converters is larger than or equal to a number of the at least one wireless charging coil.

12. The vehicle-mounted charging device according to claim 9, wherein at least one power converter of the plurality of power converters is a buck non-isolated DC-DC power converter.

13. The vehicle-mounted charging device according to claim 2, wherein the main body unit further comprises a main heat dissipation element disposed corresponding to the circuit board, and the main heat dissipation element is located in the first accommodation space for dissipating heat of the circuit board.

14. The vehicle-mounted charging device according to claim 2, wherein the main housing further defines and forms a second accommodation space, and the at least one wireless charging coil is disposed in the second accommodation space.

15. The vehicle-mounted charging device according to claim 14, wherein the first and second accommodation spaces are thermally insulated from each other through a heat insulation material.

16. The vehicle-mounted charging device according to claim 14, wherein the main body unit further comprises a coil heat dissipation element, a inner surface of the main housing has a step structure, and the coil heat dissipation element is disposed on the step structure so as to transfer heat of the at least one wireless charging coil to the main housing.

17. The vehicle-mounted charging device according to claim 2, wherein there are further a protection circuit, a filtering circuit and an auxiliary power circuit disposed on the circuit board, the protection circuit is electrically connected to the input interface and the filtering circuit, and the filtering circuit is electrically connected to the charging circuit and the auxiliary power circuit.

18. The vehicle-mounted charging device according to claim 1, wherein the vehicle-mounted charging device is mounted in a vehicle, the vehicle comprises two front seats, a rear seat, a armrest box located between the two front seat, and a center console, the plurality of wired charging units is disposed on the armrest box, and the at least one wireless charging coil is disposed on the armrest box or the center console.

19. The vehicle-mounted charging device according to claim 18, wherein a data transmission circuit and a communication controller are disposed on the circuit board, the communication controller is connected to the charging circuit, the at least one wireless charging coil, the plurality of wired charging units and the data transmission circuit, wherein when the wireless electronic device is disposed on the wireless charging coil, the wireless electronic device communicates and transmits data with a vehicle terminal through the data transmission circuit, the communication controller, the wireless charging coil and the charging circuit, and wherein when the wired electronic device is connected to the wired charging unit, the wired electronic device communicates and transmits data with the vehicle terminal through the data transmission circuit, the communication controller, the wired charging unit and the charging circuit.

20. The vehicle-mounted charging device according to claim 18, wherein fixing components of the output terminals of the plurality of wired charging units are equally distributed and fixed on a periphery of the armrest box.

\* \* \* \* \*